Oct. 13, 1925.
H. V. ROBBINS
DISPLAY DEVICE
Filed May 18, 1922
1,557,332
3 Sheets-Sheet 1
Fig:1.
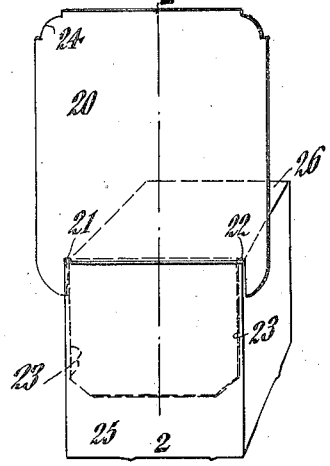
Fig:2.
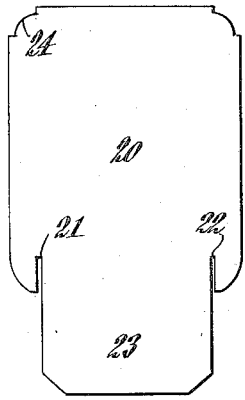
Fig:3.
Fig:4.
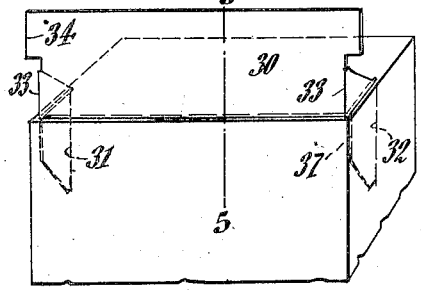
Fig:5.
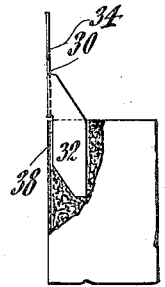
Fig:6.
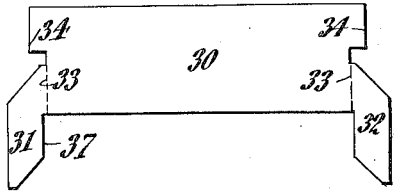
Fig:7.
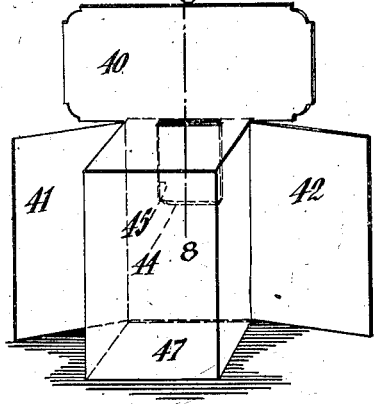
Fig:8.
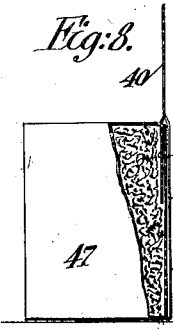
Fig:9.
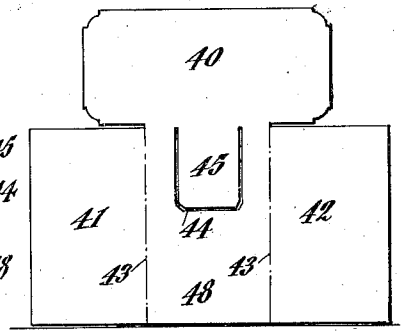
INVENTOR
Harold V. Robbins
BY C. P. Gepel
ATTORNEY

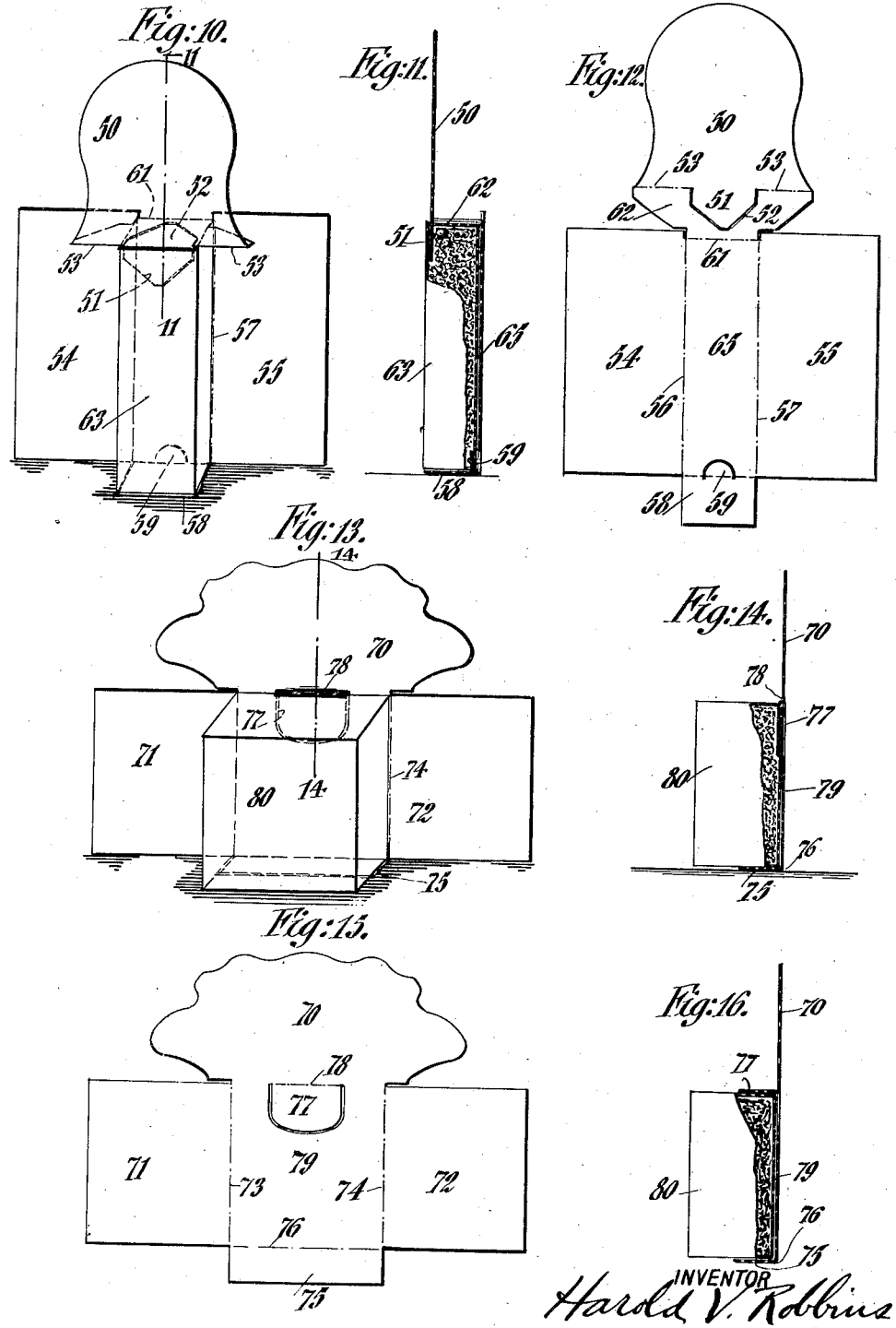

Oct. 13, 1925.
H. V. ROBBINS
DISPLAY DEVICE
Filed May 18, 1922
1,557,332
3 Sheets-Sheet 3
Fig: 17.
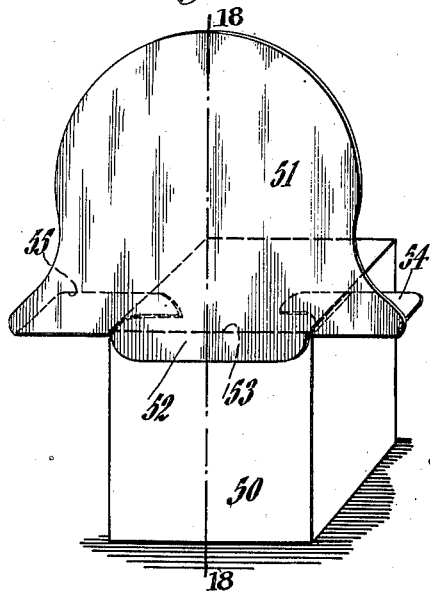
Fig: 18.
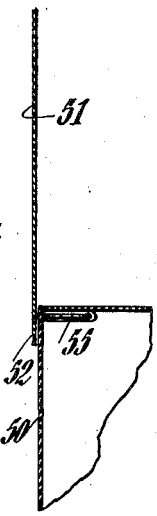
Fig: 19.
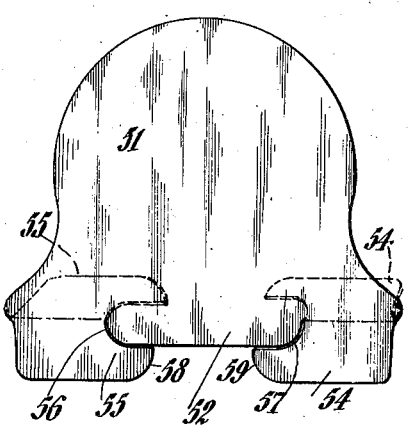
Fig: 20.
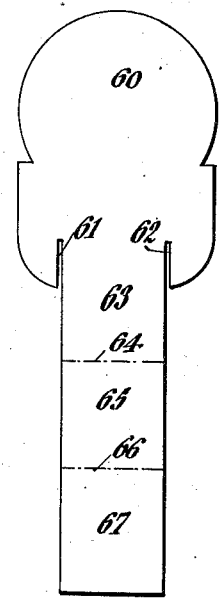
Fig: 21.
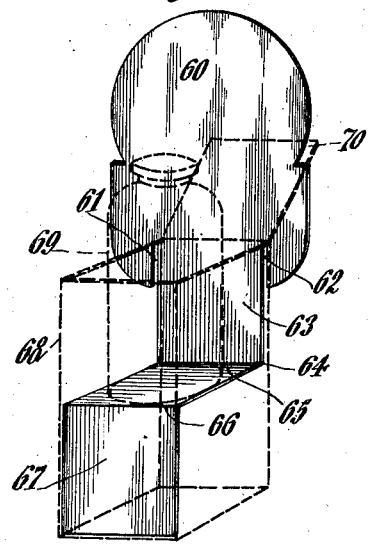
INVENTOR
Harold V. Robbins
BY C. P. Goepel
ATTORNEY Patented Oct. 13, 1925.

1,557,332

UNITED STATES PATENT OFFICE.

HAROLD V. ROBBINS, OF NEW YORK, N. Y., ASSIGNOR TO HARRY B. KRUGER, OF NEW YORK, N. Y.

DISPLAY DEVICE.

Application filed May 18, 1922. Serial No. 561,815.

*To all whom it may concern:*

Be it known that I, HAROLD V. ROBBINS, a citizen of the United States, and resident of the city of New York, borough of Bronx, county of Bronx, and State of New York, have invented certain new and useful Improvements in Display Devices, of which the following is a specification.

This invention relates to display devices and has for its object to provide a very simple and efficient display device which may be applied to packages containing articles of food or such articles as are used in households, or otherwise used and easily put up in packages which contain advertising matter or the like printed thereon. The general object of the invention is to provide a very simple device which will in the most efficient manner be applicable to such packages, and be properly held thereby in position so that the display surface may be in the proper position for its intended function.

The invention is shown in the accompanying drawings, and described hereinafter and finally pointed out in the claims.

In the accompanying drawings:

Fig. 1 is a perspective view of one embodiment of my invention showing the same as applied to the upper portion of a package;

Fig. 2 is a section of Fig. 1 taken on line 2—2 of Fig. 1;

Fig. 3 shows the blank of the embodiment shown in Figs. 1 and 2;

Fig. 4 is a perspective view of another embodiment; Fig. 5 is a sectional view taken on line 5—5 of Fig. 4; Fig. 6 is a plan view of a blank shown in Figs. 4 and 5; Fig. 7 is a view of another embodiment of my invention; Fig. 8 is a section taken on line 8—8 of Fig. 7; Fig. 9 is a plan view of the blank of the embodiment shown in Figs. 7 and 8; Fig. 10 is a perspective view of another embodiment; Fig. 11 is a section taken on line 11—11 of Fig. 10; Fig. 12 is a plan view of the blank used in Figs. 10 and 11; Fig. 13 is a perspective view of another embodiment; Fig. 14 is a section taken on the line 14—14 of Fig. 13; Fig. 15 is a plan view of the blank of the embodiment shown in Figs. 13 and 14; Fig. 16 is a sectional view of the embodiment shown in Fig. 15, but applied to a box in a different manner; Figs. 17, 18 and 19 show another embodiment, with Fig. 17 a perspective view, Fig. 18 a central sectional view on line 18—18 of Fig. 17, and Fig. 19 a plan of the blank used; and Figs. 20 and 21 another embodiment with Fig. 20 showing a plan of the blank and Fig. 21 an application to a package when in use.

Similar characters of reference indicate similar parts throughout the various views.

Referring to the drawings, and more particularly to Figs. 1, 2 and 3, the blank 20 is provided with a cut-out 21 and another at 22, and is cut in its shape so as to provide a main tongue 23. The upper portion is provided with a suitable configuration, as indicated at 24, to aid the decorative effect. The embodiment shown in Fig. 3 is applied to the top of a package, which package is usually made from what is known as a combined display and container of foldable character, or which is in turn also made of a blank, and then folded into package form. The part 23 of Fig. 3 may be readily inserted into the package between one of the side walls and the lid or cover, as shown in Fig. 2. The package 25 is provided with a top 26 and with a front wall 27, and between the two is inserted the tongue 23 of the display device 20, so that the cut-outs 21 permit the sides 28 of the package to enter into the cut-outs, whereby a very secure holding effect is obtained. Above the tongue 23 extends the major portion of the blank, indicated by 20, and upon this suitable lithography or the like can be arranged to advertise the contents of the package.

In the embodiment shown in Figs. 4, 5 and 6, the blank 30 is provided with lateral tongues 31 and 32 which are part of the blank, but which are separated from the portion 30 by score lines 33. The blank is provided with lateral extensions 34 to aid in giving a larger display surface. When this blank is applied to the upper portion of a closed package, the tongues 31 and 32 are bent along the score lines 33 and inserted along the side of the package, as shown in Fig. 4. This embodiment has the advantage of being readily applicable to such packages which have such covers that do not permit the insertion of the embodiment shown in Figs. 1, 2 and 3. When the tongues 31 and 32 are inserted alongside of the package, a very secure holding effect is obtained because the straight portions 37 act against the front part 38 of the package, and thereby a very tight hugging action is obtained.

In Figs. 7, 8 and 9 another embodiment is shown, and the blank there shown in Fig. 9 consists of the display surface 40 and auxiliary display surfaces 41 and 42, the display surfaces 41 and 42 being of the same blank as the display surface 40, but separated therefrom by score lines 43. The blank is provided with a cut-out, indicated by 44, which provides a tongue 45. When it is desired to apply this embodiment to a package, the tongue 45 is inserted between the material in the package and the rear wall 48 of the package 47, and thereby the tongue and the portion 48 of the device straddle the rear wall of the package. The display surface 40 extends above the uppermost part of the package 47, and the auxiliary display surfaces 41 and 42 are arranged respectively to the right and left hand of the package and aid thereby in giving further advertising surfaces. The insertion of the tongue 45 within the package as described gives a very secure hold to the display device.

In Figs. 10, 11 and 12 another embodiment is shown which extends from the front to the rear of the package, having its securing tongue at the front of the package, and in Fig. 12 the blank thereof is shown. This blank consists of the display surface 50 having a tongue 51 separated from the remaining portion of the blank by the cut-out 52. Score lines 53 are provided to enable the display surfaces 50 to be bent from the remaining portion of the blank. Auxiliary display surfaces 54 and 55 are provided with score lines 56 and 57. The blank also has a projection 58 with a tongue 59 separated from the blank by the cut-out 60. A score line 61 is provided and lateral members 62 may be bent from the score lines 61. When it is desired to apply this embodiment to a package, the extension 58 is placed below the bottom of the package 63 and the tongue 59 is inserted in the lowest part of the package between the material and back wall of the package. The portion 65 of the blank extends vertically upwardly along the rear of the package, and the lateral portion 62 is then bent forwardly around the score line 61 so as to enable the tongue 51 to be inserted into the package at the rear of the front wall thereof, and between the front wall and the material contained in the package. This brings the display surface 50 forwardly in substantially vertical alignment with the front wall of the package 63. By the combined action of the tongue 51 at the front and top of the package, and the tongue 59 at the rear and bottom of the package, a very efficient holding device is obtained and the display device is securely held in position, and at the same time ample display surfaces, as indicated by the main display surface 50, and the auxiliary display surfaces 54 and 55 are provided.

In the embodiments shown in Figs. 13, 14 and 15 the general idea described is again shown, and the blank shown in Fig. 15 has a display surface 70 which has auxiliary display surfaces 71 and 72, bendable in respect to the blank by the score lines 73 and 74. A lower extension 75 is provided which is bendable in respect to the blank by the score line 76. A tongue 77 is provided which is bendable at the blank by the score line 78. The display surface 70 may be arranged in any suitable configuration to enable articles of merchandise to be realistically depicted. This embodiment may be readily applied to a package by placing the package upon the lowermost extension 75 and bringing the portion 79 of the blank vertically upward at the rear of the package, then inserting the tongue 77 into the package between the rear wall and the material in the package. The display device may be readily applied to the package 80, shown in Fig. 13, by inserting the tongue 77 into the top of the package and the tongue 75 below the package.

Fig. 16 shows a slightly different manner of applying the embodiment shown in Fig. 15. Instead of inserting the tongue 77 into the package between the wall thereof and the material therein contained, the tongue 77 is placed on the top of the package. By the tongue 77 frictionally pressing down upon the top of the package and the tongue 75 being held tightly against the back of the package 80 and the rear wall 79 of the device being in parallelism with the rear wall of the package, a very secure holding device is provided.

In Fig. 17, I have shown a display device with a display surface 51, having an extension 52, and two ears 54 and 55, as shown better in Fig. 19. The ears are bent back, as shown in dotted lines, and the points thereof are adapted to enter into the package at the sides thereof underneath the top cover of the package. The side central sectional view of Fig. 18 shows how the extension 52 extends below the top of the box or package, and how the points thereof insert into the package.

In Figs. 20 and 21, another modification is shown. A blank is shown in Fig. 20, with the display surface 60 having two cut-out recesses 61 and 62, and an extension 63 with a score line 64, a further extension 65 with a score line 66 and final extension 67. The blank is bent to position on the score lines. Then it is inserted into a box after the bottle thereof is removed, and then the bottle is placed thereon so as to extend beyond the box. So, the display surface 60 has its recesses entered by the box sides, the part 63 is vertical and abuts against the back of the box, the part 65 is horizontal and supports the bottle, and the part 67 is vertical and has its end rest on the bottom of the box. Then a very efficient display device is provided.

I have shown various embodiments of my invention, and it will be noticed that a feature common to all of them is that a portion of the display device enters into the package between the walls of the package and the material therein contained, and is held therein by frictional contact and has display surfaces extending beyond the package, either upwardly alone or upwardly and laterally at either side thereof, as shown, and by the coaction of the part of the display device with the package itself the relatively large display surface may be held securely in position and serve by its information printed thereon or articles depicted thereon to further advertise the packages or materials contained in the packages.

Changes may be made in these various embodiments of my invention without departing from the spirit of my invention, which is defined in the accompanying claims.

I claim as new:

1. In a display device, the combination with a package having a slit formed in the upper portion thereof and material within the package forming a sheath with the outer wall of the package to which the slit is an entrance, of a display blank having a downwardly extending lip adapted to be inserted in the slit in the upper portion of the package and into the sheath formed by the package and the material in the package and rigidly held therebetween.

2. In a display device, the combination with a package having a slit in its upper portion and means therein forming a sheath to which the slit is the entrance, of a display blank having a projection forming a lip adapted to be inserted into said slit and said sheath, and means on the blank extending laterally of the lip for engaging the exterior of the package.

3. A display device for packages, comprising a display surface having a tongue, auxiliary display surfaces, and having a second tongue, the first tongue being adapted to be inserted in the top of a package between one wall thereof and the material therein contained, and the second tongue being adapted to be inserted at the bottom of the package between one wall thereof and the material therein contained.

In testimony that I claim the foregoing as my invention, I have signed by name hereunder.

HAROLD V. ROBBINS.